US012354215B1

(12) United States Patent
Langlois et al.

(10) Patent No.: US 12,354,215 B1
(45) Date of Patent: Jul. 8, 2025

(54) OVERHANG DETECTION FOR USE IN THREE-DIMENSIONAL OBJECT RECONSTRUCTION

(71) Applicant: Amazon Technologies, Inc., Seattle, WA (US)

(72) Inventors: Pierre-Alain Langlois, Vincennes (FR); Frederic Laurent Pascal Devernay, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 17/850,528

(22) Filed: Jun. 27, 2022

(51) Int. Cl.
*G06T 15/30* (2011.01)
*G06T 7/11* (2017.01)

(52) U.S. Cl.
CPC .............. *G06T 15/30* (2013.01); *G06T 7/11* (2017.01); *G06T 2200/16* (2013.01); *G06T 2200/24* (2013.01); *G06T 2207/10028* (2013.01)

(58) Field of Classification Search
CPC ....... G06T 19/006; G06T 17/00; G06T 15/20; G06T 2210/61; G06T 2207/10028; G06T 7/12; G06T 7/246; H04N 13/282; G06V 20/64; G06V 10/44; G06V 10/443; G06V 10/758; G06V 10/46; G06V 10/25; G03H 2210/30; G05D 1/0251; G06F 2203/04802; B33Y 50/02; B33Y 80/00; B33Y 50/00; B29C 64/40; B29C 64/386
See application file for complete search history.

(56) References Cited

U.S. PATENT DOCUMENTS 11,302,019 B2 * 4/2022 Yokoyama ............ G06T 7/0006

OTHER PUBLICATIONS

Bender, Dylan, and Ahmad Barari. "Overhanging Feature Analysis for the Additive Manufacturing of Topology Optimized Structures." International Design Engineering Technical Conferences and Computers and Information in Engineering Conference. vol. 51722. American Society of Mechanical Engineers, 2018. (Year: 2018).*
Choi, Changhyun, Alexander JB Trevor, and Henrik I. Christensen. "RGB-D edge detection and edge-based registration." 2013 IEEE/RSJ International Conference on Intelligent Robots and Systems. IEEE, 2013. (Year: 2013).*

* cited by examiner

*Primary Examiner* — Sumati Lefkowitz
*Assistant Examiner* — Connor L Hansen
(74) *Attorney, Agent, or Firm* — Klarquist Sparkman, LLP

(57) ABSTRACT

A method is disclosed to automatically detect overhangs from images with depth taken around an object during a scan of the object. An overhang detector can use an intersection of three filters based on these images and depth data associated with the images. The first filter looks for negative depth gradients along a 2D projection of a gravity vector, which is generally a vertical axis for images taken using a portrait orientation. The second filter selects the depth gradients that are oriented towards the projection of the gravity vector. The third filter is a salient object detection mask computed from the image. An intersection of the three filters can then be used to obtain overhangs. The method can be implemented in real time with a User Interface (UI) directing a user of a location of the overhang so that an image below the overhang can be taken.

19 Claims, 7 Drawing Sheets

OVERHANG DETECTION FOR USE IN THREE-DIMENSIONAL OBJECT RECONSTRUCTION

BACKGROUND

Three-dimensional (3D) object reconstruction has applications in multiple areas including on-line sales of products. For example, sellers can obtain images of products for sale and the images can be used to render a 3D model for an online marketplace. The object reconstruction includes obtaining images of an object and generating a 3D model by sensing surfaces of a physical object from a plurality of viewpoints. Imaging hardware should be placed in different locations because a field of view is limited and objects can contain occlusions. Humans are generally selecting the views, but the views can be inadequate due to different object shapes and sizes. Typically, with Next-Best-View (NBV), the required views are not planned in advance, but are performed iteratively during a surface reconstruction process. However, currently, NBV is slow due to an amount of reconstruction performed on the 3D images before a next view can be determined. Accordingly, faster methods are needed, particularly, for an application executing on image-capturing devices having limited processing power, such as a mobile phone.

DETAILED DESCRIPTION

An application includes a user interface to guide a user through different camera orientations for 3D scanning of an object. A simple strategy to scan the object is to take regularly, spaced pictures above and around the object. However, many objects include overhangs that require the user to take pictures from below the overhang. If an image is not taken from below the overhang, then an unseen surface can result in reconstruction failure.

A method is disclosed to automatically detect overhangs in images including a depth parameter during a scan of the object. The images can be considered from a lowest orbit around the object with the images taken in a direction of a horizon. An overhang detector can use an intersection of three filters based on these images and depth data associated with the images. The first filter looks for negative depth gradients along a 2D projection of a gravity vector, which is generally a vertical axis for images taken using a portrait orientation. The second filter selects the depth gradients that are oriented towards the projection of the gravity vector. The third filter is a salient object detection mask computed from the image. An intersection of the three filters can then be used to obtain overhangs. The method can be implemented in real time with a User Interface (UI) directing a user of a location of the overhang so that an image below the overhang can be taken. If multiple overhangs are detected, a suggestion can be made for the user to flip the object for a second scan, which can be merged with the first scan. If the image is taken at an angle, it can be desirable to project the gravity vector onto the image in order to account for the angle of the image. Such angle information can be obtained from the Inertial Measurement Unit sensor on a phone. Thus, the vertical axis that is selected for use can correspond to the gravity vector or the projected gravity vector depending on the angle of the image. Whichever vertical axis is selected, it can then be used in determining gradients and applying filters.

Figure 1:
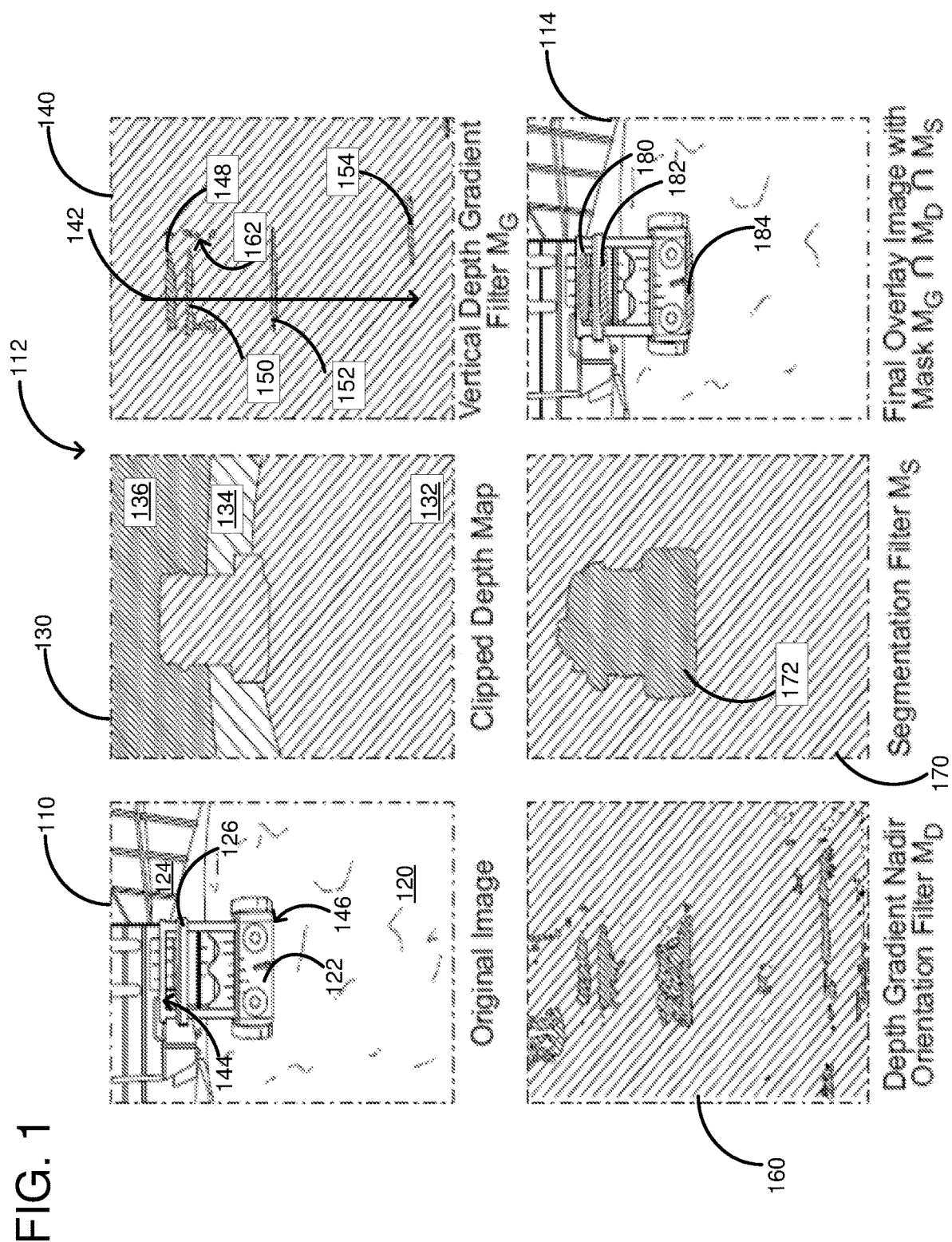
FIG. 1 shows an image of an object with different filters applied to detect one or more overhangs in the object.

FIG. 1 shows an original image 110 and various filters (shown generally at 112) applied to generate a final overlay image 114 with overhangs highlighted. The original image 110 includes a foreground 120, an object of interest 122 and a background 124. The object of interest 122 is a toy that includes a horizontal protrusion 126 that creates an overhang. Addition overhangs are detected in the object 122 as further described below. Typically, when taking images of an object for 3D reconstruction, a surface directly beneath the overhang 126 can be difficult to capture. As such, it is desirable to inform a user taking the images that an overhang 126 exists and prompt the user to take an image of a surface beneath the overhang for proper 3D reconstruction. As further described below, the image 110 can be formed by a plurality of pixels and each pixel can have an associated depth parameter. At 130, a clipped depth map can be generated wherein the depth parameter is used to eliminate a background to focus on the object of interest. A threshold can be set (e.g., 3 ft) whereby any pixels having a depth greater than 3 feet can be clipped and are not analyzed. As shown, cross-hatching 132 represents pixels in the image having a depth of less than 3 feet. Cross-hatching 134 represents a depth between 3 and 4 feet and cross-hatching 136 represents pixels at a depth greater than 4 feet. The depth threshold can be changed based upon the particular application. Thus, the clipped depth map does not include image information, but rather just depth information for each pixel.

A first filter can be applied to the clipped depth map 130, as shown at 140. A vertical axis is determined at 142 and negative gradients are identified along a direction of the vertical axis towards a base of the object. In one example, each horizontal row of pixels can be compared to a previous row when progressing down the vertical axis 142 and if the depth change is in a negative direction more than a threshold amount, the filter activates the pixel location. Thus, by looking at the depth gradient along the vertical axis $\partial d/\partial y$, it is possible to detect occlusion boundaries that follow the horizontal direction. In particular, using the sign of a gradient change, it is possible to tell whether the hidden surface looks towards a top or a bottom of the object. Surfaces that face upward can be filtered and surfaces that face downward can be allowed to pass. The activated pixels shown by cross-hatching at 148, 150 and 152, represent gradient changes exceeding the threshold. The activated pixels 148 corresponds to overhang 144, the activated pixels 150 correspond to overhang 126 and the activated pixels 152 correspond to overhang 146, which is a bottom of the object. Pixels 154 are unrelated to the object and are filtered out using different filters, as further described below.

A second filter output is shown at 160 and is designed to remove vertical or slanted gradients from the clipped depth map 130. For example, a vertical edge of the object 122 can be detected by the vertical depth gradient filter, as shown at 162. However, vertical edges or edges within a predetermined angle (slanted) of the vertical axis 142 do not create overhangs. Accordingly, the depth gradient nadir orientation filter is used to better control the orientation of the occluded surface. The depth gradient orientation can be computed as dir=arctan 2∂d/∂x, ∂d/∂y.

Other formulas can be used based on the particular application. For occlusion boundaries, this quantity gives a good approximation of the projection of the occlusion normal on the frame. Assuming that the angle of the nadir direction on the image is known, the depth map gradient can be filtered to keep only the areas where the gradient is close to the nadir: $M_d|dir-n|<t_n$.

A third filter output is shown at 170 and uses a segmentation filter to filter out all pixels except those of the object 122. Thus, the object 122 is shown in filtered form at 172. The three filters can be logically ANDed to obtain the final overlay image 114 for display to the user. Additionally, the overlay image 114 has extra highlighting added, such as is shown at 180, 182, and 184. The highlighting points the user to the overhangs 144, 126 and 146 of the object 122. Using the highlighted overhangs, the user can be asked to capture images of the surfaces beneath the overhang. In cases, such as at 184, where the highlighting is near the bottom of the object 122, the user can be asked to flip the object over to capture the bottom surface. Thus, the method includes the intersection of 3 filters based on the image and depth data. The first filter looks for negative depth gradients along the vertical axis. The second filter selects the depth gradients which are oriented towards the nadir. And the last filter is a salient object detection mask computed from the image. In some embodiments, the clipped depth map 132 need not be used, particularly in controlled environments wherein the background does not include overhangs. Additionally, the segmentation filter 170 can be used to ensure that background overhangs are eliminated. For these reasons, the clipped depth map can be eliminated. Additionally, it should be noted that the three filters can be performed in any order, as the outputs of the filters are inputs into a logical AND operation.

Embodiments described herein can be used in a variety of applications. For example, with 3D printing, an object with overhangs requires building additional support. Therefore, overhang detection can help determine the need for additional support in real time. Additionally, the user is prompted for capturing images before reconstruction of an image surface is initiated. This allows a relatively low-power application, such as an application running on a phone, to perform the overhang analysis. Prior-art 3D scanning applications rely on augmented reality and partial reconstruction that merges 3D information contained in previous frames to detect missing areas during the scan of an object. However, augmented reality-based applications are energy-guzzling and typically prevent users from scanning more than 20 objects without recharging the device. The method described herein relies solely on raw depth maps and does not involve a Visual-Inertial Odometry algorithm, which allows the disclosed method to scale better and to use low-power mobile devices.

By varying the depth gradient direction threshold $t_n$, different potential applications of the algorithm can be used. A "tight thresholds" setup uses the following parameters:

$$t_d=1.5 \text{ m}, t_s=0.005 \text{ m·pixel}^{-1}, t_n=2°$$

Using a very tight angular threshold $t_n$ allows detection of overhangs that are almost perfectly horizontal. This allows to automatically infer new points of views for images where an overhang is detected using the current azimuth and a pre-defined elevation in $$\left[\frac{\pi}{2}, \pi\right].$$

Regarding the user interface, sometimes, only a part of the surface is not visible. In this case, it is reasonable to ask the user to take a few additional pictures in the corresponding zone. However, other cases include an overhang which is visible from most sides of the object. In this case, the user can be advised to flip the object for a second scan. This could be inferred on the ratio of images from the lowest orbit that include overhangs.

For a "slack thresholds" setup, the following parameters can be used:

$$t_d=1.5 \text{ m}, t_s=0.005 \text{ m·pixel}^{-1}, t_n=20°$$

Using a bigger threshold $t_n$ yields more points which make the visualizations more meaningful. However, it displays overhangs whose normal is not horizontally centered with respect to the camera. This setup is better suited to provide visual information and let the user choose where to take the additional pictures.

Figure 2:
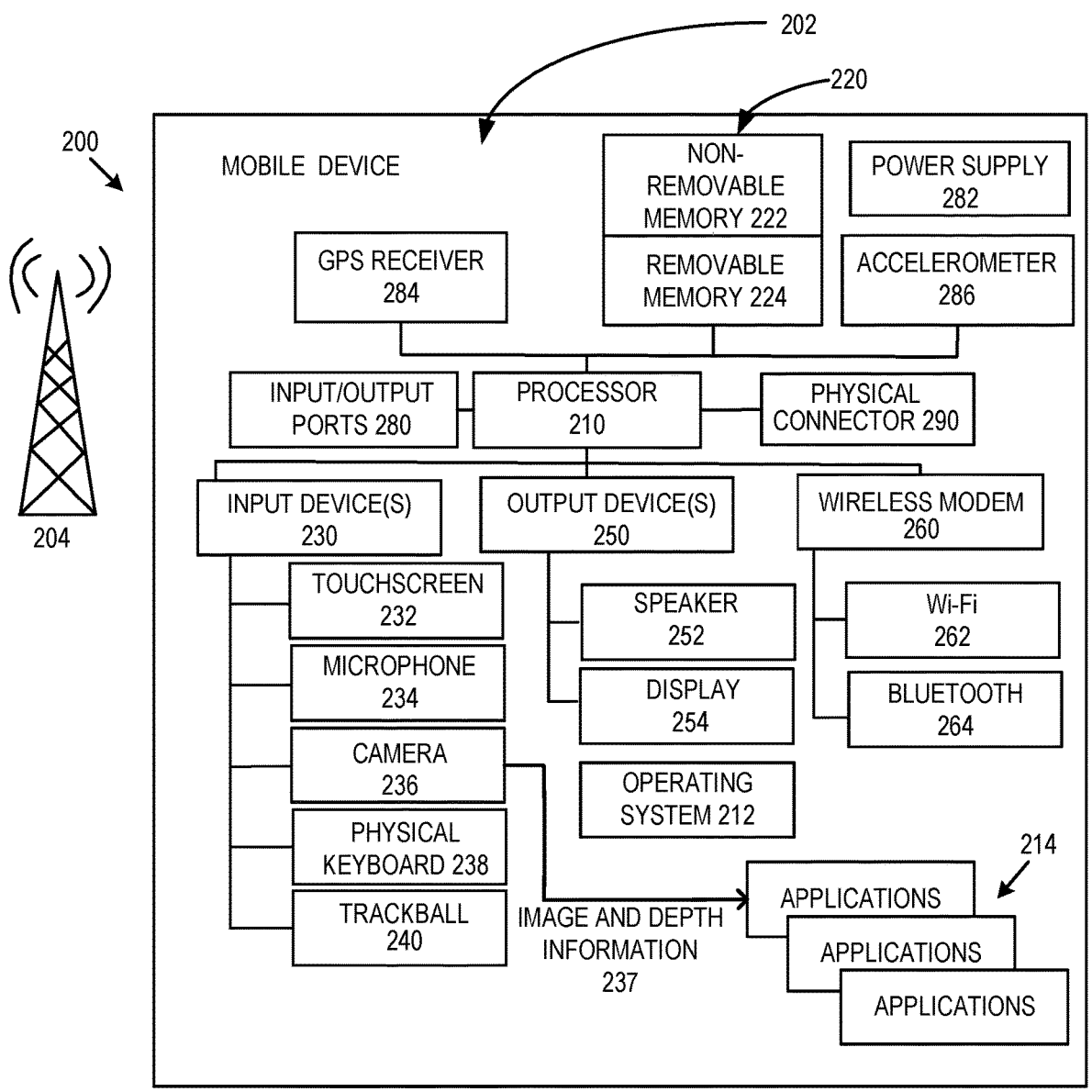
FIG. 2 shows a mobile device used to capture the image and transmit image and depth information to a mobile application.

FIG. 2 is a system diagram depicting an exemplary mobile device 200 including a variety of optional hardware and software components, shown generally at 202. The mobile device 200 can be used to capture image and depth information described above. Any components 202 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 204, such as a cellular or satellite network.

The illustrated mobile device 200 can include a controller or processor 210 (e.g., signal processor, microprocessor, ASIC, or other control and processing logic circuitry) for performing such tasks as signal coding, data processing, input/output processing, power control, and/or other functions. An operating system 212 can control the allocation and usage of the components 202 and support for one or more application programs 214.

The illustrated mobile device 200 can include memory 220. Memory 220 can include non-removable memory 222 and/or removable memory 224. The non-removable memory 222 can include RAM, ROM, flash memory, a hard disk, or other well-known memory storage technologies. The removable memory 224 can include flash memory or a Subscriber Identity Module (SIM) card, which is well known in GSM communication systems, or other well-known memory storage technologies, such as "smart cards." The memory 220 can be used for storing data and/or code for running the operating system 212 and the applications 214. Example data can include text, images, sound files, video data, or other data sets to be sent to and/or received from one or more network servers or other devices via one or more wired or wireless networks. One or more of the applications 214 can be used to perform the filtering discussed in relation to FIG. 1. Additionally, the applications 214 can be used to interface with the user to prompt the user to take additional images of an object based upon the filtering. Accordingly, the user can receive an interactive experience wherein advice is provided identifying overhangs that have hidden surfaces. The applications can be executed on the processor 210 due to the simplicity of the filtering described above. The memory 220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 200 can support one or more input devices 230, such as a touchscreen 232, microphone 234, camera 236, physical keyboard 238 and/or trackball 240 and one or more output devices 250, such as a speaker 252 and a display 254. The camera 236, which can include a depth sensor, can capture image and depth information, which can be passed to the applications either directly, as shown at 237 or through the operating system 212. Alternatively, the camera 236 can pass only the image data to the application and the depth information can be inferred from the image using a third-party application. In either case, the depth information can be passed to the application. The input devices 230 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

A wireless modem 260 can be coupled to an antenna (not shown) and can support two-way communications between the processor 210 and external devices, as is well understood in the art. The modem 260 is shown generically and can include a cellular modem for communicating with the mobile communication network 204 and/or other radio-based modems (e.g., Bluetooth 264 or Wi-Fi 262). The wireless modem 260 is typically configured for communication with one or more cellular networks, such as a GSM network for data and voice communications within a single cellular network, between cellular networks, or between the mobile device and a public switched telephone network (PSTN).

The mobile device can further include at least one input/output port 280, a power supply 282, a satellite navigation system receiver 284, such as a Global Positioning System (GPS) receiver, an accelerometer 286, and/or a physical connector 290, which can be a USB port, IEEE 1394 (FireWire) port, and/or RS-232 port. The illustrated components 202 are not required or all-inclusive, as any components can be deleted and other components can be added.

Figure 3:
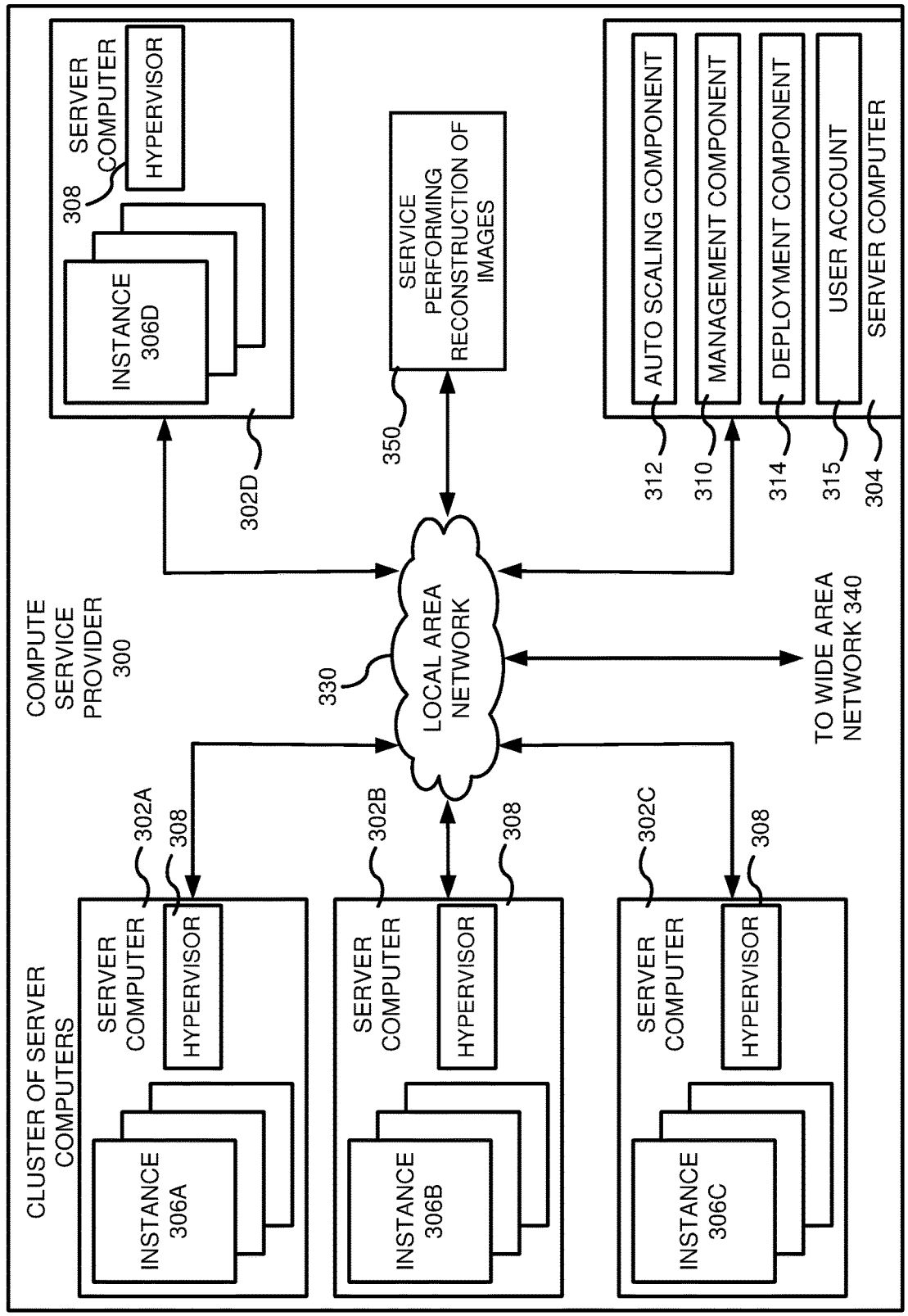
FIG. 3 is an example system diagram showing a plurality of virtual machine instances running in the multi-tenant environment, wherein a service of the multi-tenant environment interacts with the application of FIG. 2 to generate a 3-dimensional reconstruction of the object.

FIG. 3 is a computing system diagram of a network-based compute service provider 300 that illustrates one environment in which embodiments described herein can be used. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example of virtual machine, each of the servers 302A-302D can be configured to execute a hypervisor 308 or another type of program configured to enable the execution of multiple instances 306 on a single server. Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 330 can be utilized to interconnect the server computers 302A-302D and the server computer 304. The network 330 can be a local area network (LAN) and can be connected to a Wide Area Network (WAN) 340 so that end customers can access the compute service provider 300. It should be appreciated that the network topology illustrated in FIG. 3 has been simplified and that many more networks and networking devices can be utilized to interconnect the various computing systems disclosed herein.

A service 350 can interact with the one or more of the applications 214 (FIG. 2) to perform 3D reconstruction of the images. The service 350 can execute on any of the server computers 302. To perform the 3D reconstruction, the service 350 can receive surface information and volumetric information in the images. However, the applications 214 can provide the final overlay image 114 without using surface information or volumetric information and without interacting with the service 350. Instead, the one or more applications 214 can generate the final overlay image using the processor 210 on the mobile device, which has significantly less processing power than a server computer executing the service 350. Once all of the images are captured, then the service 350 can perform the 3D reconstruction. Due to the interactive experience with the applications 214, the images used for the 3D reconstruction include surfaces below any detected overhangs.

Figure 4:
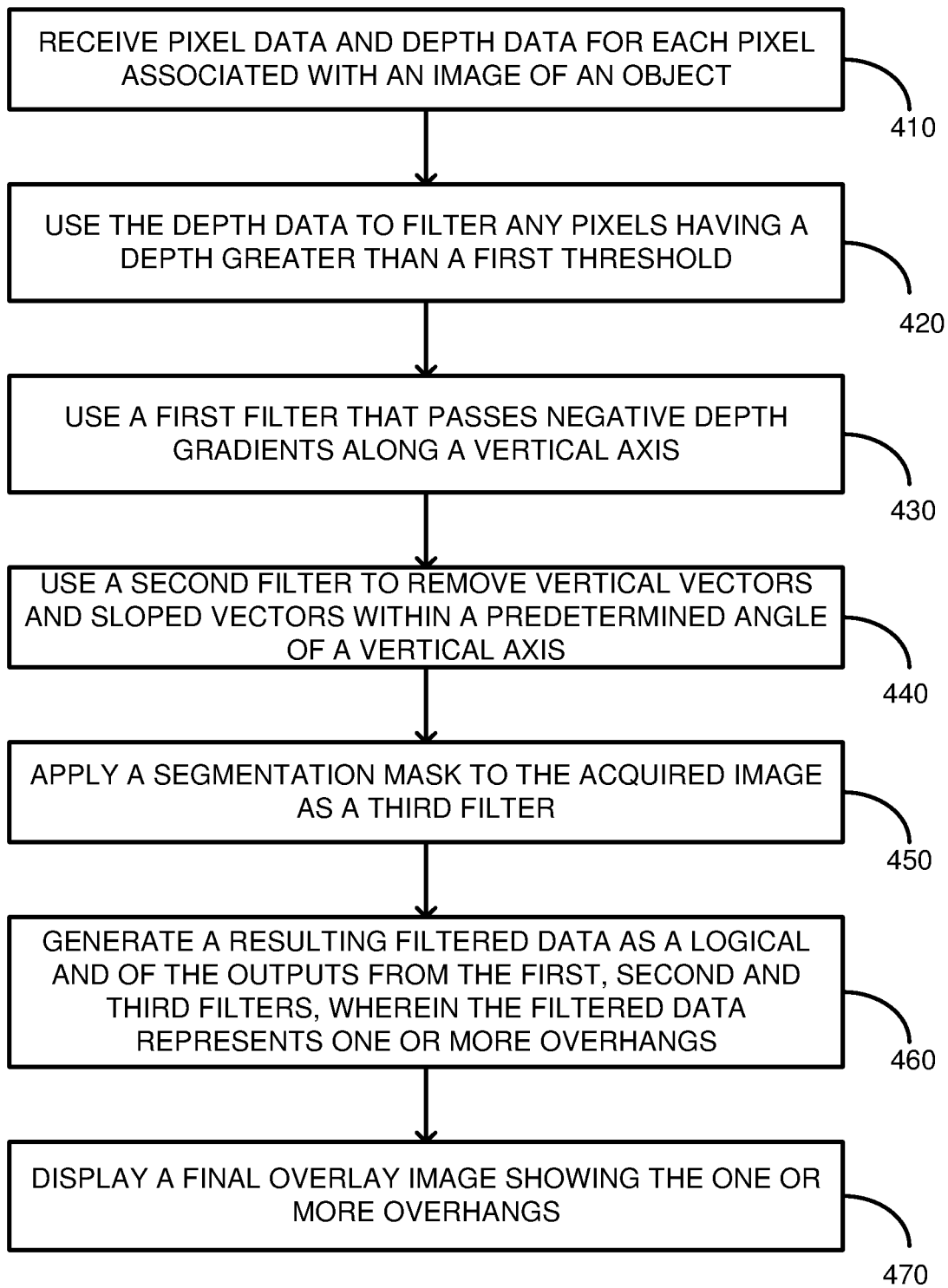
FIG. 4 is a flowchart according to a first embodiment for displaying an overlay image having one or more overhangs on the object.

FIG. 4 is a flowchart according to a method for displaying overhangs to a user when capturing images for 3D reconstruction. In process block 410, pixel data (an RGB data value) is received and together with depth data for each pixel associated with an image. For example, using the camera 236 (FIG. 2), image (the RGB values) and depth information 237 can be transmitted to an application 214. The image can be of an object, such as object 122 in FIG. 1. In process block 420, the depth data is used to filter any pixels having a depth greater than a predetermined threshold (such as a distance of 3 ft). For example, the clipped depth map 130 is generated by clipping any pixel over the threshold distance. In process block 430, a first filter is used that passes negative depth gradients along a vertical axis. For example, in FIG. 1, an analysis is performed down the vertical axis 142. For detected gradients having a negative depth transition greater than a threshold amount, the filter 140 can display the gradients as potential overhang locations. For example, depth information for one row of pixels can be subtracted from an adjacent row of pixels and if the difference is greater than a predetermined amount and negative, the filter highlights the transition, such as is shown at 148. In process block 440, a second filter is used to remove vertical vectors and sloped vectors. Vertical vectors and vectors having a significant slope do not create overhangs and can be filtered. For example, the filter 160 can detect vertical gradients or gradients having a slope greater than a predetermined angle and such gradients can be filtered. A vertical gradient is shown at 162 and represents a side edge of the object 122. Such vertical gradients can be filtered. In process block 450, a segmentation mask can be applied to the acquired image as a third filter. For example, in FIG. 1, a segmentation filter 170 is used on the original image 110 to segment the object 172 from a rest of the image. In process block 460, a result is generated by logically combining (e.g., a logical AND operation) the outputs of the filters from process blocks 430, 440 and 450 to obtain resulting filtered data that represents overhangs. Thus, a pixel-by-pixel logical AND can occur. In process block 470, the overhangs can be displayed as an overlay on the image. For example, in FIG. 1, the final overlay image 114 can add graphics 180, 182, 184 to the original image to highlight points of overhangs. The graphics can be highlighting or any other visual indication that overhangs are detected. The user can then focus on the overhang areas for any additional images captured.

Figure 5:
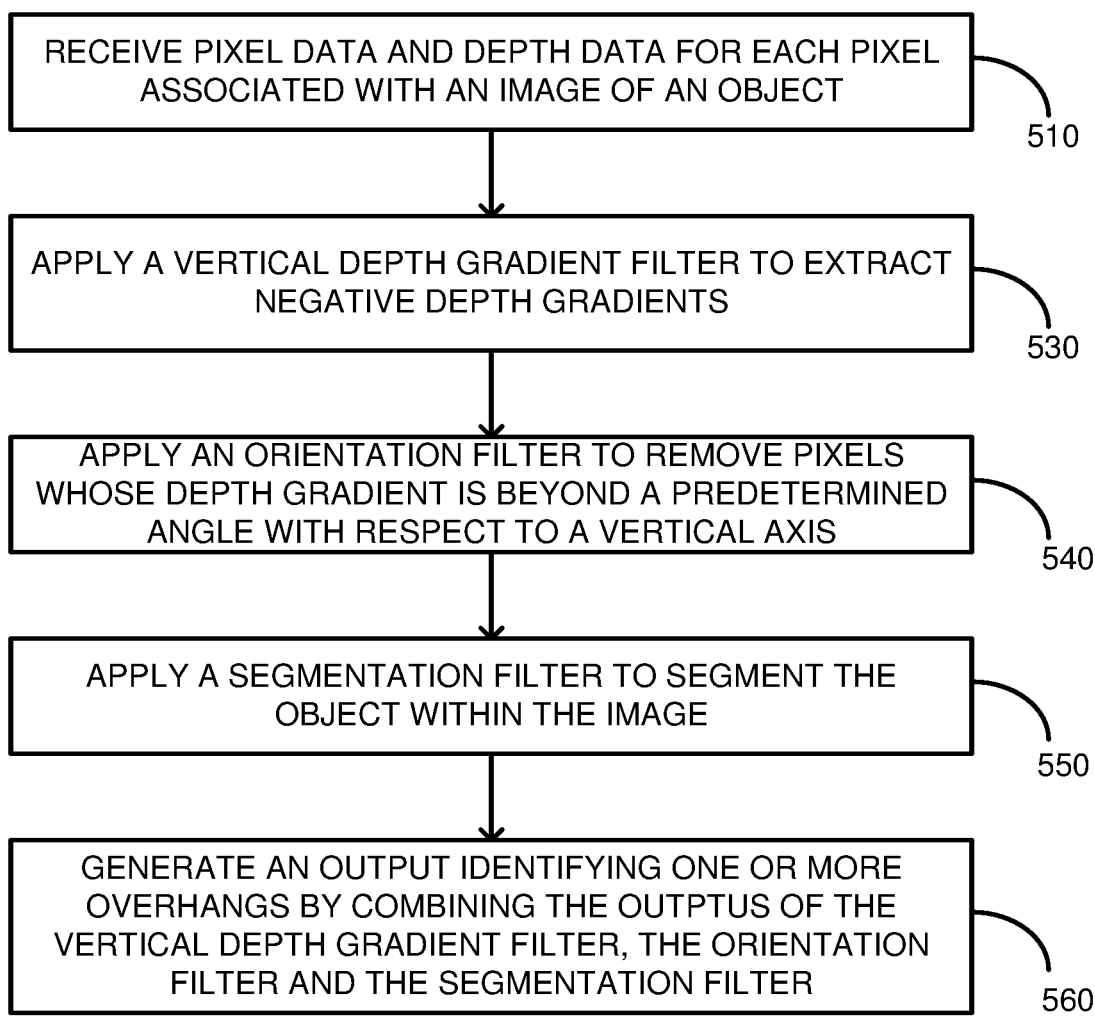
FIG. 5 is a flowchart according to another embodiment for displaying an overlay image having one or more overhangs on the object.

FIG. 5 is a flowchart according to another embodiment for detecting an overhang in an image. In process block 510, pixel data is received together with depth data for each pixel associated with an image of an object. For example, in FIG. 2, the application 214 can receive pixel and depth information 237 from the camera 236. The latest mobile phone cameras capture depth information for each pixel. In process block 530, a vertical depth gradient filter is applied to extract negative depth gradients. Most typically, negative depth changes in a vertical direction from one horizontal vector to a next horizontal vector represent an overhang. Thus, a pixel-by-pixel subtraction can occur between adjacent rows or groups of rows to detect the negative depth changes. In process block 540, an orientation filter can be used to remove pixels whose depth gradient is beyond a predetermined angle with respect to a vertical axis. These vectors also represent a change in depth along a length of the vector from adjacent pixels. However, vertical gradients or heavily sloped gradients do not typically represent overhangs and are filtered out. In process block 550, a segmentation filter is applied to segment the object in the image. Different off-the-shelf segmentation modules can be used. In process block 560, an output is generated identifying one or more overhangs by combining (e.g., a logical AND) the outputs of the filters from process blocks 530, 540, and 550. The overhangs can then be displayed to the user in any desired format.

Figure 6:
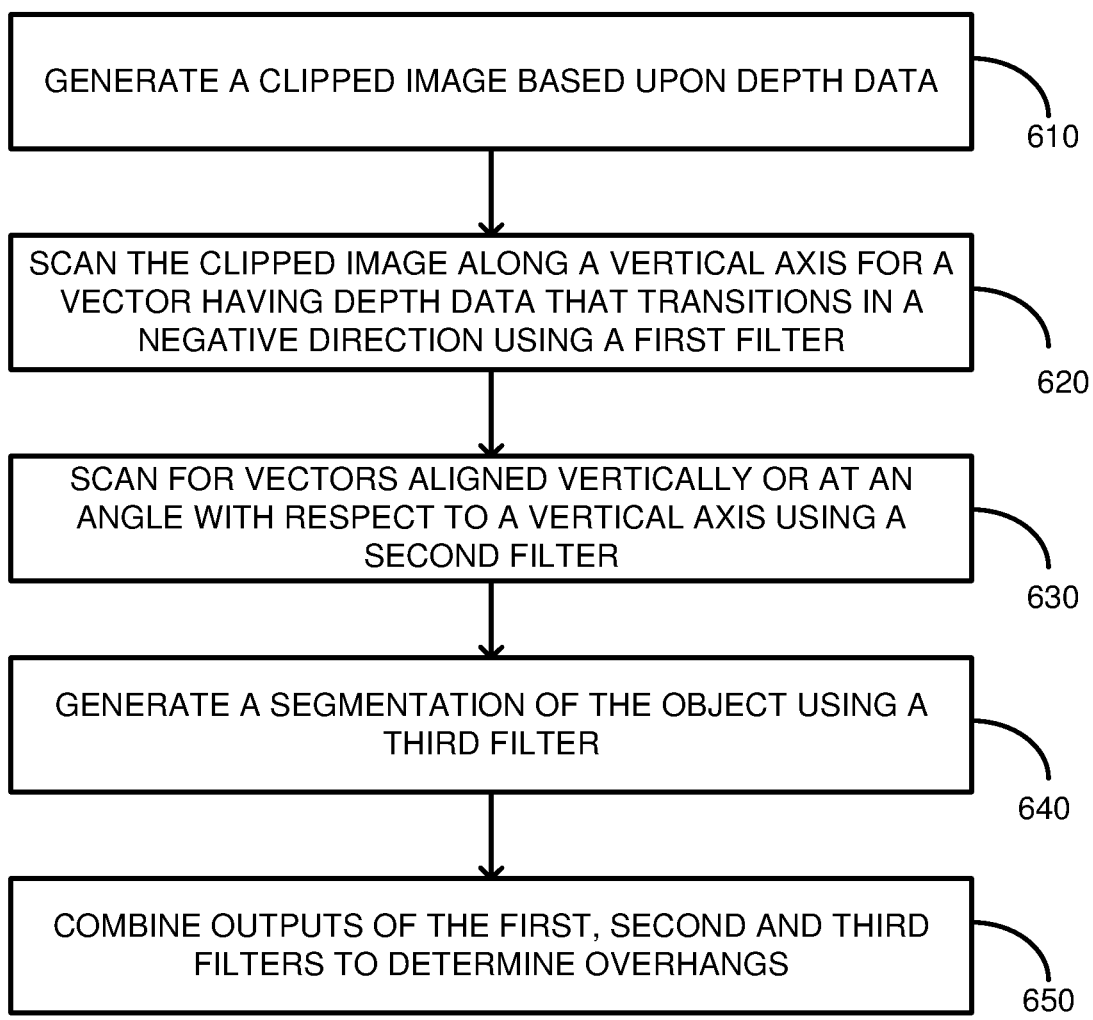
FIG. 6 is a flowchart according to yet another embodiment for displaying an overlay image having one or more overhangs on the object.

FIG. 6 is yet another embodiment of detecting overhangs. In process block 610, a clipped image is generated using depth data. Thus, an image including pixel data and associated depth data is received for analysis by an application. The clipped image is generated using the depth data by filtering data exceeding a predetermined depth. In process block 620, the clipped image is scanned along a vertical axis for a vector having a depth data that transitions in a negative direction with respect to adjacent pixels above the vector. In process block 630, a scan is performed for vectors aligned vertically or at an angle with respect to the vertical axis. For example, in FIG. 1, a depth gradient nadir orientation filter can be used. In process block 640, a segmentation of the object can be generated using a segmentation filter. In process block 650, the outputs of all three filters can be combined to determine overhangs. For example, a logical AND can be performed on all of the outputs of the filters to obtain a final output indicating where overhangs exist. The final output can then be superimposed on the original image so that overhangs can be readily seen by the user.

Figure 7:
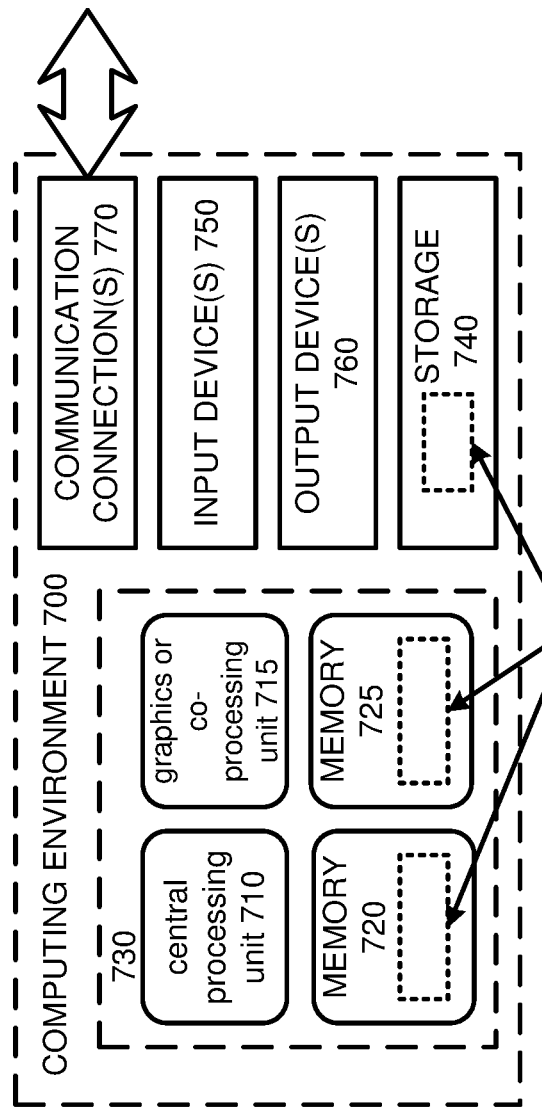
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). In one embodiment, an application can execute the overhang detection on a server computer of FIG. 3. In another embodiment, the application can be the application 214 of FIG. 2.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of detecting overhangs in an object for acquiring images for three-dimensional reconstruction of the object, the method comprising:
   receiving pixel data and depth data for each pixel associated with an acquired image of the object;
   using the depth data to filter out any pixels having a depth greater than a first threshold to obtain a clipped object image data;
   filtering, using a first filter, the clipped object image data, wherein the first filter passes negative depth gradients along a vertical axis of the clipped object image data;
   filtering, using a second filter, the clipped object image data, wherein the second filter removes vertical vectors and sloped vectors beyond a predetermined angle of a vertical axis;
   applying a segmentation mask to the acquired image of the object as a third filter;
   generating a resulting filtered data as a logical AND of outputs from the first, second and third filters, wherein the resulting filtered data represents one or more overhangs on the acquired image of the object; and
   displaying a final overlay image including the acquired image of the object with the resulting filtered data showing the one or more overhangs.

2. The method of claim 1, wherein the method executes in an application within a mobile device.

3. The method of claim 1, wherein the final overlay image is generated without performing a surface reconstruction.

4. The method of claim 1, receiving additional images of the objects and performing three-dimensional image reconstruction on the object.

5. The method of claim 1, determining that the one or more overhangs are visible on more than one side of the object and prompting a user to flip the object upside down for an additional image acquisition.

6. A method, comprising:
   receiving an image of an object including pixel data and depth information associated with each pixel;
   applying a vertical depth gradient filter to extract negative depth gradients from the image of the object;
   applying an orientation filter to remove the pixels whose depth gradient vector is beyond a predetermined angle with respect to a vertical axis of the image of the object;
   applying a segmentation filter on the image to segment the object within the image; and
   generating an output identifying one or more overhangs in the object by combining using a logical AND operation the outputs of the vertical depth gradient filter, the orientation filter and the segmentation filter.

7. The method of claim 6, further including using the negative depth gradients to determine whether hidden surfaces are upward facing or downward facing and filtering out upward facing hidden surfaces.

8. The method of claim 6, further including filtering a background of the image using a clipped depth map, wherein the clipped depth map filters a background of the image that is greater than a predetermined distance using the depth information.

9. The method of claim 6, wherein the vertical depth gradient filter detects occlusion boundaries that follow a horizontal direction.

10. The method of claim 6, further including generating a user interface that indicates to a user where to capture another image of the object to visualize a surface below the one or more overhangs.

11. The method of claim 6, further including generating a three-dimensional rendering of the object using, in part, the image.

12. The method of claim 6, wherein the output is a final overlay image that is presented without performing a surface reconstruction.

13. The method of claim 6, wherein the method executes in an application within a mobile device.

14. One or more computer-readable storage media, comprising computer-executable instructions that, when executed, cause a computing system to perform a method comprising:
   generate a clipped image based upon depth data associated with each pixel in an image of an object;
   scan the clipped image along a vertical axis for a vector having depth data that transitions in a negative direction beyond a threshold amount using a first filter;
   scan the clipped image for vectors aligned vertically or at an angle less than a threshold amount with respect to the vertical axis using a second filter;
   generate a segmentation of the object within the image using a third filter; and
   combine outputs of the first, second and third filters to determine overhangs associated with the object.

15. The computer-readable storage media according to claim 14, wherein the instructions, upon execution, further cause the computer system to:
   display to a user a location of the overhangs as an overlay on the image of the object.

16. The computer-readable storage media according to claim 14, wherein the instructions, upon execution, further cause the computer system to:
   receive the image and the depth data from a camera of a mobile device.

17. The computer-readable storage media according to claim 14, wherein the generating of the clipped image includes filtering out pixels that exceed a threshold distance.

18. The computer-readable storage media according to claim 14, wherein the negative direction includes the depth increasing, which is indicative of a overhang.

19. The computer-readable storage media according to claim 14, wherein the combining includes performing a pixel-by-pixel logical AND for each result of the first, second and third filters.

* * * * *